United States Patent
Sakai et al.

(10) Patent No.: US 12,062,162 B2
(45) Date of Patent: Aug. 13, 2024

(54) IMAGE PROCESSING DEVICE, IMAGE PROCESSING METHOD, AND RECORDING MEDIUM

(71) Applicants: NEC CORPORATION, Tokyo (JP); Central Research Institute of Electric Power Industry, Tokyo (JP)

(72) Inventors: Masahito Sakai, Tokyo (JP); Norihiko Itoh, Yokosuka (JP)

(73) Assignees: NEC CORPORATION, Tokyo (JP); Central Research Institute Of Electric Power Industry, Tokyo (JP)

( * ) Notice: Subject to any disclaimer, the term of this patent is extended or adjusted under 35 U.S.C. 154(b) by 422 days.

(21) Appl. No.: 17/433,885

(22) PCT Filed: Feb. 26, 2020

(86) PCT No.: PCT/JP2020/007798
§ 371 (c)(1),
(2) Date: Aug. 25, 2021

(87) PCT Pub. No.: WO2020/175566
PCT Pub. Date: Sep. 3, 2020

(65) Prior Publication Data
US 2022/0051374 A1    Feb. 17, 2022

(30) Foreign Application Priority Data
Feb. 27, 2019    (JP) .................... 2019-034750

(51) Int. Cl.
*G06K 9/00*    (2022.01)
*G06K 7/14*    (2006.01)
(Continued)

(52) U.S. Cl.
CPC .............. *G06T 5/80* (2024.01); *G06K 7/1417* (2013.01); *G06K 7/1456* (2013.01); *G06V 10/20* (2022.01);
(Continued)

(58) Field of Classification Search
CPC ...... G06T 5/006; G06V 10/20; G06V 10/247; G06V 2201/034; G06K 7/1417; G06K 7/1456
See application file for complete search history.

(56) References Cited

FOREIGN PATENT DOCUMENTS

| JP | 2002-056387 A | 2/2002 |
|---|---|---|
| JP | 2008-040519 A | 2/2008 |

(Continued)

OTHER PUBLICATIONS

Duchin, Yuval, et al. "Feasibility of using ultra-high field (7 T) MRI for clinical surgical targeting." PloS one 7.5 (2012): e37328. (Year: 2012).*

(Continued)

*Primary Examiner* — Avinash Yentrapati
(74) *Attorney, Agent, or Firm* — Sughrue Mion, PLLC

(57) ABSTRACT

An image processing device performs projection conversion that makes an image captured of an object to be recognized closer to a normal image captured from front of the object to be recognized based on a correlation between: a pre-specified plurality of feature ranges dispersed within a range of the object to be recognized; and a plurality of feature ranges designated based on the dispersion in the image.

8 Claims, 6 Drawing Sheets

(51) Int. Cl.
   *G06T 5/80*      (2024.01)
   *G06V 10/20*     (2022.01)
   *G06V 10/24*     (2022.01)

(52) U.S. Cl.
   CPC ...... *G06V 10/247* (2022.01); *G06V 2201/034* (2022.01)

(56) References Cited

FOREIGN PATENT DOCUMENTS

JP      2009-087087 A    4/2009
   JP      2013-152198 A    8/2013

OTHER PUBLICATIONS

International Search Report for PCT/JP2020/007798 dated May 26, 2020 [PCT/ISA/210].
Written Opinion for PCT/JP2020/007798 dated May 26, 2020 [PCT/ISA/237].

\* cited by examiner

IMAGE PROCESSING DEVICE, IMAGE PROCESSING METHOD, AND RECORDING MEDIUM

CROSS REFERENCE TO RELATED APPLICATIONS

This application is a National Stage of International Application No. PCT/JP2020/007798 filed Feb. 26, 2020, claiming priority based on Japanese Patent Application No. 2019-034750 filed Feb. 27, 2019.

TECHNICAL FIELD

The present invention relates to an image processing device, an image processing method, and a recording medium.

BACKGROUND ART

Many facilities such as factories and hospitals are equipped with a large number of objects to be recognized, such as instruments and other equipment, that a person such as an administrator should check and recognize the state thereof. For example, in the case of an instrument, it is necessary to accurately read and record a numerical value on a scale pointed to by a pointer provided on the instrument. Patent Document 1 discloses, as a related technique, a technique for recognizing the display contents of various types of status indicators including an indicator.

PRIOR ART DOCUMENTS

Patent Documents

[Patent Document 1] Japanese Unexamined Patent Application, First Publication No. 2002-56387

SUMMARY OF THE INVENTION

Problem to be Solved by the Invention

Here, there is a demand for a technique for recognizing the state of an object to be recognized with higher accuracy by using an image captured of such an object to be recognized.

Therefore, an object of the present invention is to provide an image processing device, an image processing method, and a recording medium capable of solving the above-mentioned issue.

Means for Solving the Problem

According to a first example aspect of the present invention, an image processing device includes: an image conversion means for performing projection conversion that makes an image captured of an object to be recognized closer to a normal image captured from front of the object to be recognized based on a correlation between: a pre-specified plurality of feature ranges dispersed within a range of the object to be recognized; and a plurality of feature ranges designated based on the dispersion in the image.

According to a second example aspect of the present invention, an image processing method includes: performing projection conversion that makes an image captured of an object to be recognized closer to a normal image captured from front of the object to be recognized based on a correlation between: a pre-specified plurality of feature ranges dispersed within a range of the object to be recognized; and a plurality of feature ranges designated based on the dispersion in the image.

According to a third example aspect of the present invention, a recording medium stores a program that causes a computer to function as: an image conversion means for performing projection conversion that makes an image captured of an object to be recognized closer to a normal image captured from front of the object to be recognized based on a correlation between: a pre-specified plurality of feature ranges dispersed within a range of the object to be recognized; and a plurality of feature ranges designated based on the dispersion in the image.

Effect of the Invention

According to the present invention, the state of the object to be recognized can be recognized with higher accuracy from a captured image of the object to be recognized.

EXAMPLE EMBODIMENT

Hereinbelow, an image processing device according to an example embodiment of the present invention will be described with reference to the drawings.

Figure 1:
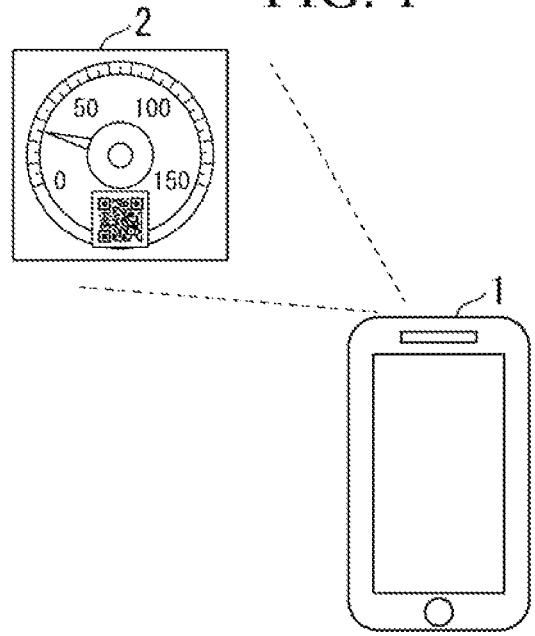
FIG. 1 is a diagram showing an outline of an image processing device according to an example embodiment of the present invention.

FIG. 1 is a diagram showing an outline of the image processing device according to the same example embodiment.

As shown in this diagram, an image processing device 1 may be, for example, a device that functions as a mobile terminal such as a smartphone. The image processing device 1 includes a camera that captures an image of an object to be recognized such as an instrument 2.

Figure 2:
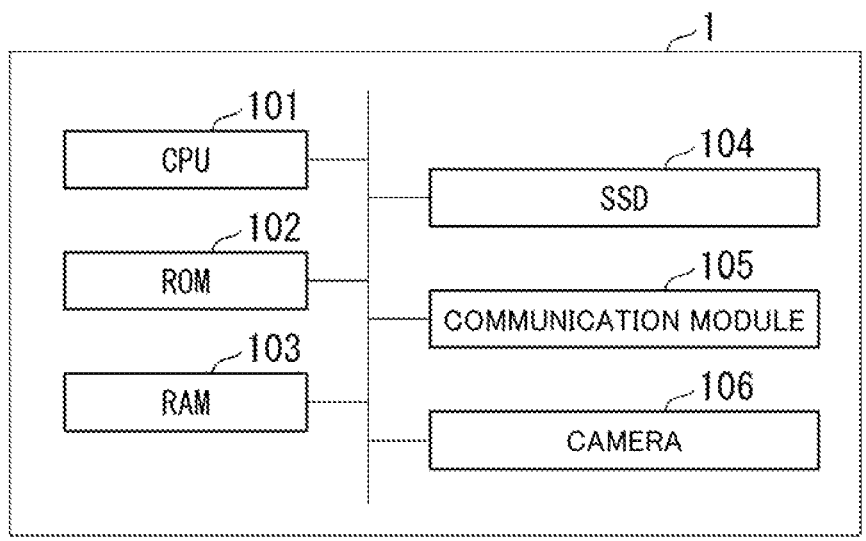
FIG. 2 is a diagram showing a hardware configuration of the image processing device according to the example embodiment of the present invention.

FIG. 2 is a diagram showing the hardware configuration of the image processing device.

As shown in FIG. 2, the image processing device 1 is a computer that includes hardware such as a CPU (Central Processing Unit) 101, a ROM (Read Only Memory) 102, a RAM (Random Access Memory) 103, an SSD (Solid State Drive) 104, a communication module 105, and a camera 106. The image processing device 1 may include other hardware configurations.

Figure 3:
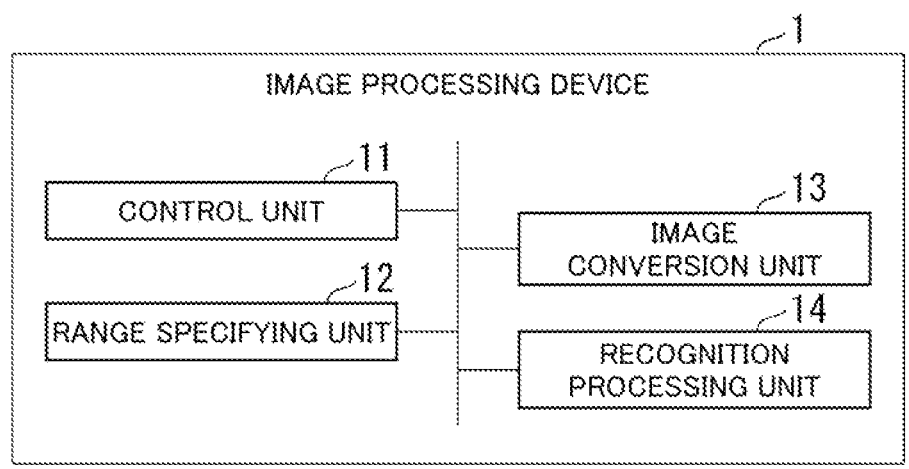
FIG. 3 is a function block diagram of the image processing device according to the example embodiment of the present invention.

FIG. 3 is a function block diagram of the image processing device.

The image processing device exhibits the functions of a control unit 11, a range specifying unit 12, an image conversion unit 13, and a recognition processing unit 14 by executing an image processing program.

The control unit 11 controls other function units.

The range specifying unit 12 specifies a range of an object to be recognized in an image obtained by capturing an image of the object to be recognized on the basis of a ratio between the size of a specified attachment object attached to the object to be recognized and the size of the object to be recognized.

The image conversion unit 13 performs projection conversion that makes an image of an object to be recognized closer to a normal image that is captured from the front of the object to be recognized on the basis of a correlation between a pre-specified plurality of feature ranges that are dispersed within a range of the object to be recognized and a plurality of feature ranges designated on the basis of the dispersion in the image captured of the object to be recognized.

The recognition processing unit 14 performs a recognition process of the state of the object to be recognized using the result of the projection conversion of the captured image of the object to be recognized.

In the present example embodiment, an example will be described in which the object to be recognized is the instrument 2, and the specified attachment object attached to the instrument is a two-dimensional code such as a QR code (registered trademark). In this case, the image processing device 1 specifies a range of the instrument 2 in an image captured by the image processing device 1 on the basis of the vertical and horizontal sizes of the two-dimensional code, which is an example of the specified attachment object attached in advance to the instrument 2, and a ratio of the distance to the ends of the instrument 2 (upper end, lower end, left end, right end, etc.) with respect to the position of the two-dimensional code. The image processing device 1 corrects the range of the instrument 2 in the image so that the distortion of the two-dimensional code appearing in the image is corrected. After that, the image processing device 1 specifies a feature range in which are printed a plurality of numbers, pre-specified and dispersed within the range of the normal image of the instrument 2, and a plurality of corresponding feature ranges in the image in which the numbers appear, designated on the basis of the dispersion in the image captured of the instrument 2. Using a projective transformation matrix calculated based on the correlation of these feature ranges, the image processing device 1 performs a process of making the corrected image that has been converted such that distortion of the two-dimensional code is corrected closer to a normal image obtained by capturing the instrument 2 from the front by additionally correcting the image with projective transformation in which distortion is eliminated. By such processing, the image processing device 1 corrects the captured image so that the state of the instrument 2 can be recognized with higher accuracy.

In the present example embodiment, an example in which the image processing device 1 is a mobile terminal will be described, but the image processing device 1 may be a PC, a computer server, or the like. In this case, the imaging device may generate a captured image of the instrument 2 described below, and the PC or the computer server may acquire the captured image from the imaging device and perform the following processing. Hereinbelow, details of the processing of the image processing device will be described.

Figure 4:
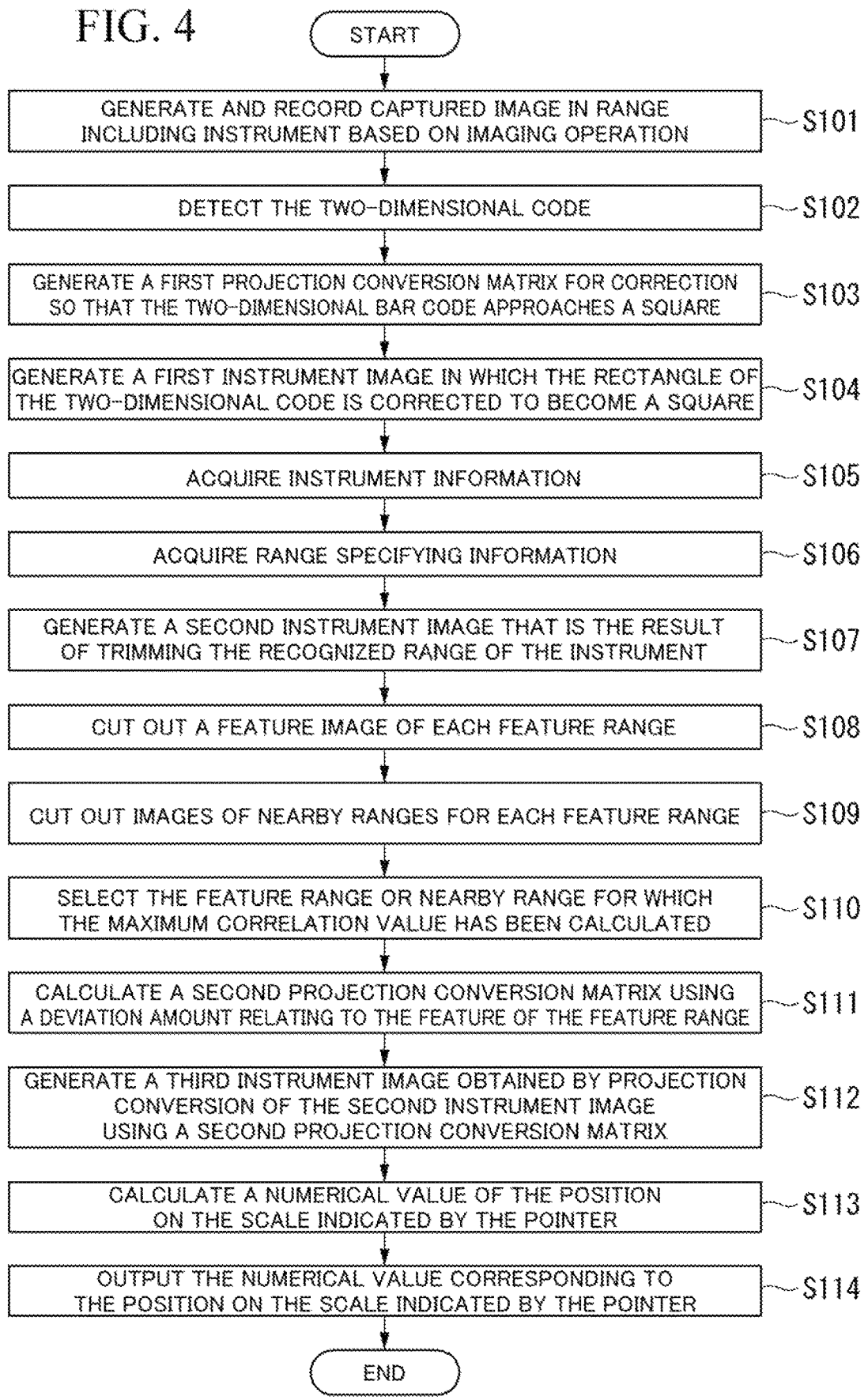
FIG. 4 is a flowchart of the image processing device according to the example embodiment of the present invention.

FIG. 4 is a flowchart of the image processing device.

Figure 5:
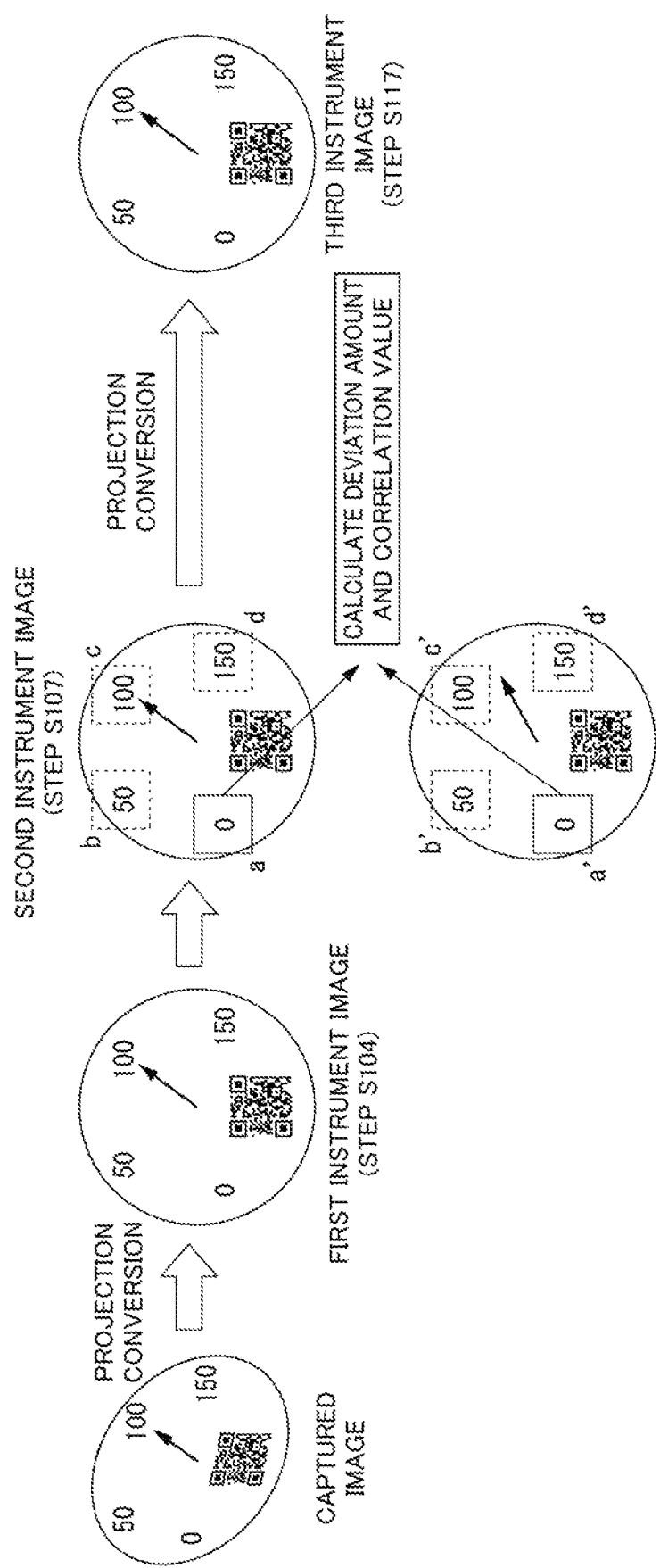
FIG. 5 is a first diagram showing an outline of processing of the image processing device according to the example embodiment of the present invention.

FIG. 5 is a first diagram showing an outline of processing of the image processing device.

Figure 6:
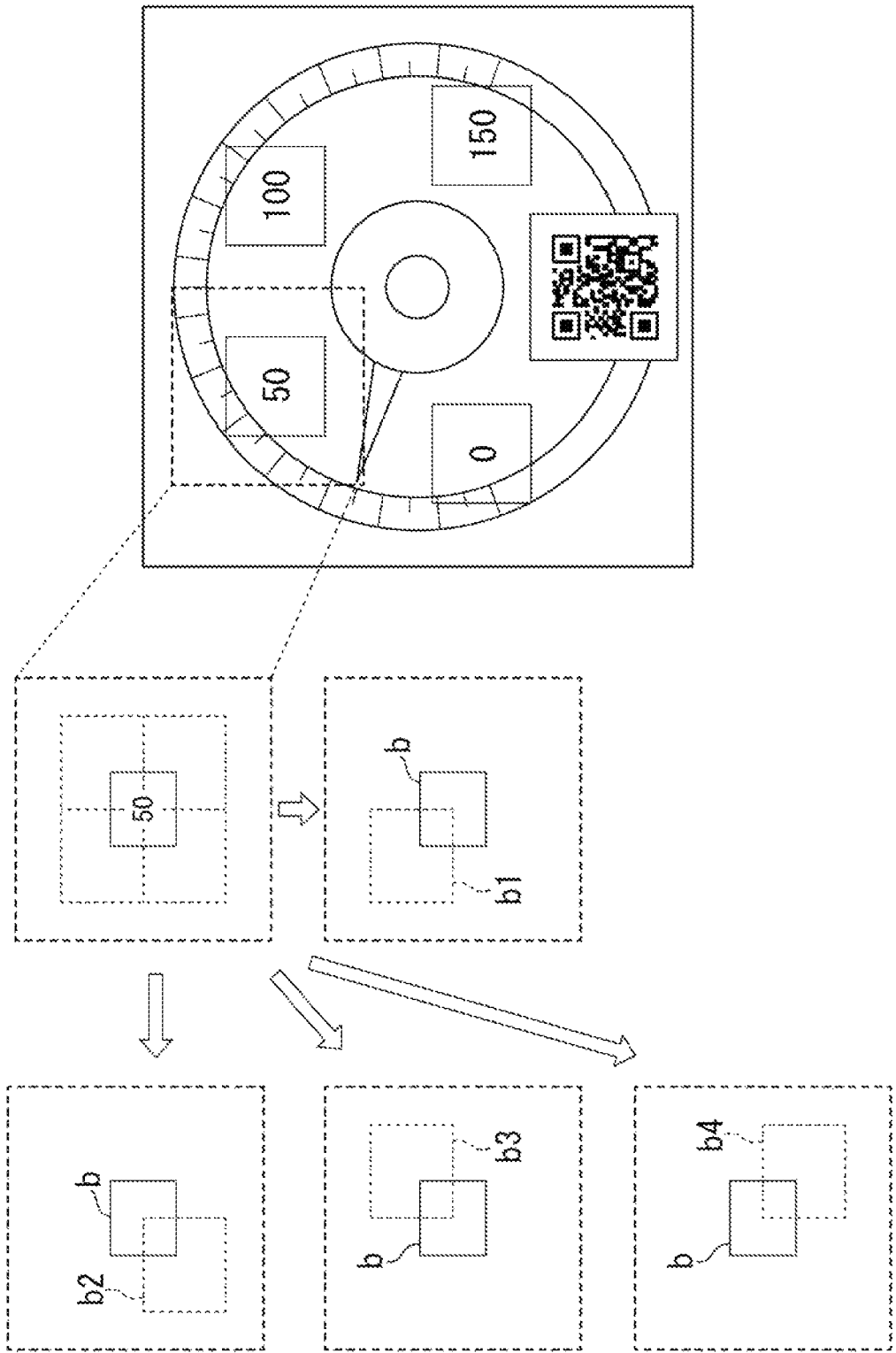
FIG. 6 is a second diagram showing an outline of processing of the image processing device according to the example embodiment of the present invention.

FIG. 6 is a second diagram showing an outline of processing of the image processing device.

First, the user operates the image processing device 1 to capture an image of the instrument 2. In the present example embodiment, the instrument 2 is an analog instrument that represents the range of the magnitude of the state quantity of an environmental state (temperature, humidity, pressure, and the like) measured by the instrument 2 with a numerical value and a scale line, and indicates with a pointer the scale corresponding to the current state quantity. As shown in FIG. 1, the instrument 2 is constituted by a scale plate on which are printed an arc-shaped scale and numerical values corresponding to the scale at predetermined intervals, and a pointer that is rotatably fixed to a shaft provided perpendicularly to the scale plate at a center position where the arc of the scale is regarded as a circle and that points to the scale. On the scale plate of the instrument 2 shown in FIG. 1, numerical values indicating state quantities such as 0, 50, 100, 150 in the range of the state quantity of the scale are printed in the vicinity of the scale at intervals corresponding to the intervals of the numerical values. Four numerical value print areas on which these numerical values are printed are referred to as feature ranges having a large amount of features. A two-dimensional code is attached to the instrument 2 in advance. The two-dimensional code may be printed on the instrument 2. The code information indicated by the two-dimensional code includes information indicating an instrument ID that identifies the instrument 2.

The image processing device 1 stores, for each instrument, measurement information including at least a normal image obtained by imaging the instrument 2 and many other instruments from the front, coordinates indicating the four feature ranges in the normal image, with the coordinates having a reference coordinate of the image as the origin, range identification information indicating the range of the instrument 2 with respect to the vertical and horizontal sizes indicated by the attached two-dimensional code, and the instrument ID which is the identification information for identifying the instrument 2. The instrument information may be recorded in a server to which the image processing device 1 can communicate. As an example, the range identification information indicating the range of the instrument 2 includes the horizontal length of the two-dimensional code and magnification information indicating how many times the left end of the instrument 2 is located from the left end of the two-dimensional code based on the horizontal length, magnification information indicating how many times the right end of the instrument 2 is located from the right end of the two-dimensional code based on the horizontal length, the vertical length of the two-dimensional code, magnification information indicating how many times the upper end of the instrument 2 is located from the upper end of the two-dimensional code based on the vertical length, magnification information indicating how many times the lower end of the instrument 2 is located from the lower end of the two-dimensional code based on the vertical length. The range identification information and instrument information including that information may be encoded and held in the two-dimensional code information. It is assumed that the range identifying information is information measured and recorded by the user after the two-dimensional code is attached to the instrument 2.

The camera 106 of the image processing device 1 generates a captured image in a range including the instrument 2 based on an imaging operation of the user, and records the image in a storage unit such as the SSD 104 (Step S101). The user then instructs the image processing device 1 to start the process to recognize the value indicated by the pointer of the instrument 2. Then, the control unit 11 reads the captured image of the instrument 2 and outputs the image to the image conversion unit 13.

The image conversion unit 13 detects the two-dimensional code attached to the instrument 2 in the captured image (Step S102). The image conversion unit 13 generates a first projection conversion matrix for performing correction so that the shape of the current two-dimensional code approaches a square on the basis of the current shape of the two-dimensional code included in the captured image and a square that is the shape of the regular two-dimensional code (Step S103). As an example, this first projection conversion matrix is calculated by a known homography transformation matrix calculation method using each deviation or correlation value between four coordinates of the rectangular corners of the two-dimensional code shown in the captured image and the four coordinates of the finder pattern and the alignment pattern obtained based on the specifications of the two-dimensional code. Alternatively, this first projection conversion matrix is calculated by a known affine transformation matrix calculation method using each deviation or correlation value between either three coordinates of the finder pattern and the alignment pattern of the two-dimensional code shown in the captured image and three coordinates of the finder pattern and alignment pattern of the two-dimensional code obtained based on the two-dimensional code specifications. The image conversion unit 13 uses the first projection conversion matrix to generate a first instrument image in which the rectangle of the two-dimensional code appearing in the captured image is corrected to become a square (Step S104). The image conversion unit 13 outputs the first instrument image to the range specifying unit 12.

Next, the range specifying unit 12 detects the instrument ID included in the two-dimensional code. The range specifying unit 12 acquires instrument information based on the instrument ID. For example, when the instrument information is recorded in the server, a transmission request for the instrument information including the instrument ID is transmitted to the server, and as a result, the instrument information stored in the server in association with the instrument ID is received and acquired (Step S105). When the image processing device 1 stores instrument information, the range specifying unit 12 specifies and reads the instrument information stored in the own device in association with the instrument ID. The range specifying unit 12 acquires the range specifying information from the instrument information (Step S106). The range specifying unit 12 acquires the above-mentioned magnification information indicating the magnification to the ends of the instrument 2 with respect to the vertical and horizontal lengths of the barcode included in the range specifying information. The range specifying unit 12 specifies the upper end, lower end, left end, and right end ranges of the first instrument image of the instrument 2 based on the magnification information and the vertical and horizontal lengths of the barcode, and recognizes the range of the instrument 2 in the first instrument image. The range specifying unit 12 trims the image based on the recognized range of the instrument 2, and generates a second instrument image that is a result of the trimming (Step S107). This process is an example of a process aspect for specifying the range of the object to be recognized in the image on the basis of the ratio between the size of the specified attachment object attached to the object to be recognized and the size of the object to be recognized. The range specifying unit 12 outputs the second instrument image to the image conversion unit 13.

Next, the image conversion unit 13 acquires the coordinate information of the four feature ranges of the instrument 2 from the instrument information. When the feature range indicates a rectangular range, the coordinate information of one feature range includes the coordinates of the four corners of the rectangle indicated by the feature range. The image conversion unit 13 cuts out a feature image of each of the four corresponding feature ranges in the second instrument image based on the coordinate information of the four feature ranges (Step S108). As an example, the four feature ranges are ranges that include the numbers 0, 50, 100, 150 printed on the scale plate of the instrument 2. In the present example embodiment, four feature ranges are specified in the instrument 2 with the respective pieces of coordinate information being included in the instrument information, but provided the ranges are those showing features that are substantially evenly distributed over the entire range of the object to be recognized such as the instrument 2, the information included in the feature range is not limited to numbers, and the number of ranges may be three or more. If the image conversion unit 13 cannot cut out the feature images of each of a predetermined number of feature ranges, the process may be terminated. In this case, the image conversion unit 13 may output to a display or the like a notification prompting the user to re-shoot the instrument 2.

The image conversion unit 13 specifies four nearby ranges in the second instrument image in which the ranges are shifted to the upper left, lower left, upper right, and lower right for each feature range, and images of the four nearby ranges are cut out for each feature range (Step S109). The upper left nearby range of the feature range is referred to as the first nearby range, the lower left nearby range of the feature range is referred to as the second nearby range, the upper right nearby range of the feature range is referred to as the third nearby range, and the lower right nearby range of the feature range is referred to as the fourth nearby range. By the above processing, in the present example embodiment, the image conversion unit 13 cuts out from the second instrument image a total of 20 images of four feature range images and images of four nearby ranges for each feature range. The specification of nearby ranges for each feature range is not limited to four, and a plurality of other nearby ranges may be specified. For example, the number of nearby ranges to be specified may be 0, or may be a plurality of numbers of 1 or more. When the number of nearby ranges to be specified is 0, only the feature range may be specified without using a nearby range. The image conversion unit 13 acquires a normal image of the instrument 2. The image conversion unit 13 similarly cuts out four feature range images even in a normal image.

The above four feature ranges in the second instrument image are referred to as feature range a, feature range b, feature range c, and feature range d. Further, in the second instrument image, the four nearby ranges of the upper left, lower left, upper right, and lower right of the feature range a are respectively referred to as the first nearby range a1, the second nearby range a2, the third nearby range a3, and the fourth nearby range a4. In the second instrument image, the four nearby ranges of the upper left, lower left, upper right, and lower right of the feature range b are respectively referred to as the first nearby range b1, the second nearby range b2, the third nearby range b3, and the fourth nearby range b4. In the second instrument image, the four nearby ranges of the upper left, lower left, upper right, and lower right of the feature range c are respectively referred to as the first nearby range c1, the second nearby range c2, the third nearby range c3, and the fourth nearby range c4. In the second instrument image, the four nearby ranges of the upper left, lower left, upper right, and lower right of the feature range d are respectively referred to as the first nearby range d1, the second nearby range d2, the third nearby range d3, and the fourth nearby range d4. Of the feature ranges and the nearby ranges in the second instrument image, the positional relationship between the feature range b and the nearby ranges b1 to b4 is shown in detail in FIG. 6. The same applies to the relationship between other feature ranges and nearby ranges.

Further, the above four feature ranges in a normal image are referred to as a feature range a', a feature range b', a feature range c', and a feature range d'. The image conversion unit 13 calculates the deviation amount and the correlation value between the corresponding feature ranges and nearby ranges of the second instrument image and the normal image by using the phase only correlation. The deviation amount and the correlation value are one information amount representing the correlation between the feature ranges of the second instrument image and the normal image. As a result, the image conversion unit 13 determines the deviation amount and the correlation value between the feature range a of the second instrument image and the feature range a' of the normal image, the deviation amount and the correlation value between the first nearby range a1 of the second instrument image and the feature range a' of the normal image, the deviation amount and the correlation value between the second nearby range a2 of the second instrument image and the feature range a' of the normal image, the deviation amount and the correlation value between the third nearby range a3 of the second instrument image and the feature range a' of the normal image, and the deviation amount and the correlation value between the fourth nearby range a4 of the second instrument image and the feature range a' of the normal image by using the phase only correlation. The image conversion unit 13 selects the feature range or the nearby range for which the maximum correlation value has been calculated from among those correlation values (Step S110). The image conversion unit 13 specifies the deviation amount calculated for the selected feature range or nearby range as the deviation amount between the second instrument image and the normal image relating to the feature (number) included in the range (any one of feature range a and nearby ranges a1, a2, a3, a4) that serves as a representative range of the five ranges (any one of feature range a and nearby ranges a1, a2, a3, a4). The image conversion unit 13 performs the same processing for all the feature range b, the feature range c, and the feature range d. From the above, the deviation amount between the second instrument image and the normal image regarding the features (numbers) of the four feature ranges dispersed in the instrument 2 can be calculated.

The image conversion unit 13 uses the deviation amount between the second instrument image and the normal image relating to the features (numbers) of the four feature ranges dispersed in the instrument 2 to calculate a second projection conversion matrix by a known homography conversion matrix calculation method (Step S111). Alternatively, the image conversion unit 13 uses the deviation amount between the second instrument image and the normal image relating to the features (numbers) of three feature ranges of the four feature ranges dispersed in the instrument 2 to calculate a second projection conversion matrix by a known affine transformation matrix calculation method.

The image conversion unit 13 generates a third instrument image obtained by projection conversion of the second instrument image using the second projection conversion matrix (Step S112). The image conversion unit 13 outputs the third instrument image to the recognition processing unit 14. Based on the position on the scale indicated by the pointer in the third instrument image, the recognition processing unit 14 calculates a numerical value that is stored corresponding to the position by using interpolation calculation or the like (Step S113). The image conversion unit 13 outputs a numerical value corresponding to the position of the scale indicated by the pointer (Step S114). For example, the output destination is a liquid crystal display, and the recognition processing unit 14 outputs the numerical value of the scale pointed to by the pointer to the liquid crystal display.

According to the above processing, when the captured image of the instrument 2 which is the object to be recognized is converted and made closer to a normal image, a projection conversion matrix is generated on the basis of the deviation amount of the feature range dispersed in the image of the instrument 2 as described above, and an image is generated that is close to a normal image. Thereby, it is possible to generate an image that recognizes the state of the object to be recognized (the state of the position of the scale pointed to by the pointer) with higher accuracy. In addition, the state of the object to be recognized can be recognized with higher accuracy by this image.

Note that the instrument 2 shown in FIG. 1 is just an example, and may also be an instrument 2 having a pointer pointing to a scale of another shape, or an instrument without a scale. According to the above processing, an example in which the object to be recognized is the instrument 2 has been described. However, the object to be recognized may be a printed object such as a label printed with a predetermined design, or an object such as a valve or a lever handle. If for example the object to be recognized is a printed object, it is possible to similarly correct the image of the printed object to make the image closer to a normal image by using a two-dimensional code included in the printed object or a known feature pattern similar thereto, and the feature range dispersed in the printed object on the basis of the image captured of the printed object. This makes it possible to find a difference with block copy data of the printed object. Also, for example, if the object to be recognized is a valve, it is possible to similarly correct the image of the value to make the image closer to the normal image by using the two-dimensional code attached to the valve and the feature range dispersed in the valve based on the image of the valve. This makes it possible to grasp the opening degree of the valve. Further, if for example the object to be recognized is a lever handle, it is possible to similarly correct the image of the lever handle to make the image closer to the normal image by using the two-dimensional code attached to the lever handle and the feature range dispersed in the lever handle based on the captured image of the lever handle. This makes it possible to grasp the position of the lever handle.

Further, in the above processing, an example in which a two-dimensional code is attached or printed on the object to be recognized as a specified attachment object has been described. However, as the specified attachment object, in addition to the two-dimensional code, a predetermined mark or a three-dimensional object may be attached to the object to be recognized, and the range of the object to be recognized may be specified on the basis of the mark or the three-dimensional object.

Further, in the above processing, the image conversion unit 13 acquires the coordinate information of the four feature ranges of the instrument 2 from the instrument information, and based on the coordinate information, cuts out a feature image of each of the four corresponding feature ranges in the second instrument image. However, the image conversion unit 13 may automatically recognize four or more feature ranges from the normal image, cut out feature ranges in the image of the instrument 2 corresponding to the feature ranges, and accept a designation of the four feature ranges from the user. This process is one aspect of a process that outputs information indicating a plurality of ranges having a large amount of features within the range of the object to be recognized, and determines any plurality of ranges of the plurality of ranges as feature ranges based on the user's specification. When this processing is performed, the image conversion unit 13 calculates the second projection conversion matrix as described above on the basis of each deviation amount and correlation value between each feature range specified by the user and each corresponding feature range corresponding to the normal image.

In the above description, in Step S107, a process of trimming the image of the instrument 2 based on the recognized range of the instrument 2 is performed, and then a projection converted image (third instrument image) is generated using the second projection conversion matrix by the processes of steps 108 to 112. However, the range specifying unit 12 may perform the process of trimming the image of the instrument 2 in Step S107 on the image after generating the projection converted image using the second projection matrix. In this case, when recognizing the range of the instrument 2, the range specifying unit 12 may estimate the range of the instrument 2 recognized in advance for the instrument 2 based on the relationship of the coordinates of a plurality of feature ranges included in the instrument 2 instead of the two-dimensional code, and trim that range.

Further, in the above process, the third instrument image is generated in the process of Step S112; however, the second projection conversion matrix may be calculated so that the distortion of the third instrument image is eliminated, correction may be further performed once or a plurality of times by the projection conversion using the matrix, and the correction may be repeated until the correlation value between the feature range appearing in the corrected image and the feature range of the normal image becomes equal to or greater than a threshold value.

Figure 7:
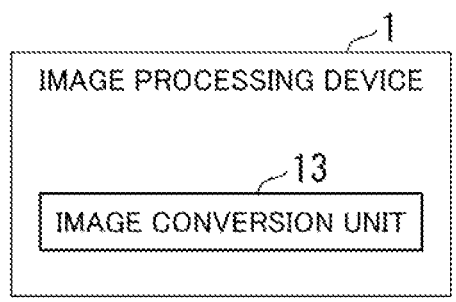
FIG. 7 is a diagram showing a minimum configuration of the image processing device according to the example embodiment of the present invention.

FIG. 7 is a diagram showing a minimum configuration of the image processing device.

As shown in this figure, the image processing device 1 may at least be a device that exhibits the function of the image conversion unit.

The image conversion unit 13 performs projection conversion that makes an image closer to a normal image that is captured from the front of an object to be recognized on the basis of a correlation between a plurality of feature ranges that are prespecified and dispersed within a range of the object to be recognized and a plurality of feature ranges designated on the basis of the dispersion in an image captured of the object to be recognized.

The above-mentioned image processing device has a computer system inside. Each of the above-mentioned processes is stored in a computer-readable recording medium in the form of a program, and the above processing is performed by the computer reading and executing this program. Here, the computer-readable recording medium refers to a magnetic disk, a magneto-optical disk, a CD-ROM, a DVD-ROM, a semiconductor memory, or the like. Further, this computer program may be distributed to a computer via a communication line, and the computer receiving the distribution may execute the program.

The above program may be for realizing some of the above-mentioned functions. Further, it may be a so-called differential file (differential program) that can realize the above-mentioned function in combination with a program already recorded in the computer system.

This application is based upon and claims the benefit of priority from Japanese patent application No. 2019-034750, filed Feb. 27, 2019, the disclosure of which is incorporated herein in its entirety by reference.

INDUSTRIAL APPLICABILITY

The present invention may be applied to an image processing device, an image processing method, and a recording medium.

REFERENCE SYMBOLS

1: Image processing device
2: Instrument
11: Control unit (control means)
12: Range specifying unit (range specifying means)
13: Image conversion unit (image conversion means)
14: Recognition processing unit (recognition processing means)

The invention claimed is:

1. An image processing device comprising:
at least one memory configured to store instructions; and
at least one processor configured to execute the instructions to:
  correct an image captured of an object to be recognized so that distortion of a specified attachment object is corrected, the specified attachment object appearing in the image and being attached to the object to be recognized; and
  perform, after the correction projection conversion that makes the corrected image closer to a normal image captured from front of the object to be recognized based on a correlation between: a pre-specified plurality of feature ranges dispersed within a range of the object to be recognized; and a plurality of feature ranges designated based on the dispersion in the corrected image.

2. The image processing device according to claim 1, wherein the at least one processor is configured to calculate a projection conversion matrix based on the correlation, and use uses the projection conversion matrix to perform the projection conversion that makes the image closer to the normal image.

3. The image processing device according to claim 1, wherein the at least one processor is configured to specify the range of the object to be recognized based on a feature included in the object to be recognized.

4. The image processing device according to claim 1, wherein the object to be recognized is an instrument, and the feature ranges are a range having a large amount of features in the instrument.

5. The image processing device according to claim 1, wherein the at least one processor is configured to output information indicating a plurality of ranges having a large amount of features within the range of the object to be recognized, and determine any designated ranges among the plurality of ranges as the feature ranges.

6. The image processing device according to claim 1, wherein the at least one processor is configured to perform a recognition process of a state of the object to be recognized by using a result of the projection conversion of the image captured of the object to be recognized.

7. An image processing method comprising:
- correcting an image captured of an object to be recognized so that distortion of a specified attachment object is corrected, the specified attachment object appearing in the image and being attached to the object to be recognized; and
- performing, after the correction, projection conversion that makes the corrected image closer to a normal image captured from front of the object to be recognized based on a correlation between: a pre-specified plurality of feature ranges dispersed within a range of the object to be recognized; and a plurality of feature ranges designated based on the dispersion in the corrected image.

8. A non-transitory recording medium that stores a program that causes a computer to execute:
- correcting an image captured of an object to be recognized so that distortion of a specified attachment object is corrected, the specified attachment object appearing in the image and being attached to the object to be recognized; and
- performing, after the correction, projection conversion that makes the corrected image closer to a normal image captured from front of the object to be recognized based on a correlation between: a pre-specified plurality of feature ranges dispersed within a range of the object to be recognized; and a plurality of feature ranges designated based on the dispersion in the corrected image.

* * * * *